United States Patent
Bent et al.

(10) Patent No.: US 9,110,695 B1
(45) Date of Patent: Aug. 18, 2015

(54) REQUEST QUEUES FOR INTERACTIVE CLIENTS IN A SHARED FILE SYSTEM OF A PARALLEL COMPUTING SYSTEM

(71) Applicants: John M. Bent, Los Alamos, NM (US); Sorin Faibish, Newton, MA (US)

(72) Inventors: John M. Bent, Los Alamos, NM (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 232 days.

(21) Appl. No.: 13/730,112

(22) Filed: Dec. 28, 2012

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 6,385,673 B1* | 5/2002 | DeMoney | 710/60 |
| 2007/0240161 A1* | 10/2007 | Prabhakar et al. | 718/104 |
| 2010/0115526 A1* | 5/2010 | Mincarelli | 718/104 |
| 2010/0332622 A1* | 12/2010 | Carolan et al. | 709/220 |
| 2011/0035752 A1* | 2/2011 | Krishnakumar et al. | 718/103 |
| 2011/0153697 A1* | 6/2011 | Nickolov et al. | 707/827 |
| 2011/0225583 A1* | 9/2011 | Suh et al. | 718/1 |
| 2012/0042256 A1* | 2/2012 | Jamjoom et al. | 715/736 |

* cited by examiner

*Primary Examiner* — Emerson Puente
*Assistant Examiner* — Dong Kim
(74) *Attorney, Agent, or Firm* — Ryan, Mason & Lewis, LLP

(57) ABSTRACT

Interactive requests are processed from users of log-in nodes. A metadata server node is provided for use in a file system shared by one or more interactive nodes and one or more batch nodes. The interactive nodes comprise interactive clients to execute interactive tasks and the batch nodes execute batch jobs for one or more batch clients. The metadata server node comprises a virtual machine monitor; an interactive client proxy to store metadata requests from the interactive clients in an interactive client queue; a batch client proxy to store metadata requests from the batch clients in a batch client queue; and a metadata server to store the metadata requests from the interactive client queue and the batch client queue in a metadata queue based on an allocation of resources by the virtual machine monitor. The metadata requests can be prioritized, for example, based on one or more of a predefined policy and predefined rules.

18 Claims, 2 Drawing Sheets

REQUEST QUEUES FOR INTERACTIVE CLIENTS IN A SHARED FILE SYSTEM OF A PARALLEL COMPUTING SYSTEM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

CROSS-REFERENCE TO RELATED APPLICATIONS

The present application is related to U.S. patent application Ser. No. 10/764,150, entitled "Method and Apparatus for Reducing Leakage Current in a Read Only Memory Device Using Shortened Precharge Phase," and U.S. patent application Ser. No. 10/764,000, entitled "Method and Apparatus for Reducing Leakage Current in a Read Only Memory Device Using Transistor Bias," each filed contemporaneously herewith and incorporated by reference herein.

FIELD

The present invention relates to high performance computing environments.

BACKGROUND

Parallel file systems are widely used in many computing environments. Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources.

Parallel file systems provide high degrees of concurrency in which many distributed processes within a parallel application simultaneously access a shared file namespace for a large number of clients. Parallel file systems are comprised of data servers that store and retrieve the user data as well as metadata servers that identify the data servers where particular data is stored. The metadata servers are also responsible for processing queries about the data, such as the size, permissions, and timestamps of data.

Parallel file systems typically serve supercomputers running large parallel non-interactive programs (often referred to as batch jobs) as well as a small number of "log-in" nodes which are used by interactive users (often referred to as "compile" or "front-end" nodes). Log-in nodes often experience slow interactive response times due to pending requests from the batch jobs filling the request queue of the metadata server. The interactive user therefore may experience long latency. A need therefore exists for improved techniques for processing interactive requests from users of log-in nodes.

SUMMARY

Embodiments of the present invention provide improved techniques for processing interactive requests from users of log-in nodes. In one embodiment, a metadata server node is provided for use in a file system shared by one or more interactive nodes and one or more batch nodes, wherein the one or more interactive nodes comprise one or more interactive clients to execute one or more interactive tasks and wherein the one or more batch nodes execute one or more batch jobs for one or more batch clients. The metadata server node comprises a virtual machine monitor; an interactive client proxy to store metadata requests from the one or more interactive clients in an interactive client queue; a batch client proxy to store metadata requests from the one or more batch clients in a batch client queue; and a metadata server to store the metadata requests from the interactive client queue and the batch client queue in a metadata queue based on an allocation of resources by the virtual machine monitor.

The metadata requests can be prioritized, for example, based on one or more of a predefined policy and predefined rules. In one embodiment, the metadata requests from the interactive clients are prioritized over metadata requests from the batch clients. The interactive client proxy, the batch client proxy and/or the metadata server can be implemented as a virtual machine.

Advantageously, illustrative embodiments of the invention provide improved processing of interactive requests from users of log-in nodes. These and other features and advantages of the present invention will become more readily apparent from the accompanying drawings and the following detailed description.

DETAILED DESCRIPTION

The present invention provides improved techniques for processing interactive requests from users of log-in nodes. According to one aspect of the invention, a virtual machine monitor provides a plurality of request queues so that requests from interactive clients and batch clients in the parallel computing system can be queued separately. In this manner, the various requests from the interactive clients and batch clients can be prioritized based on a predefined policy. In one exemplary embodiment, the virtual machine monitor provides an interactive proxy client and a batch proxy client to queue the requests from the interactive clients and batch clients, respectively. For example, requests from interactive users can be prioritized over batch jobs so that a human user can work interactively with the parallel file system.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Virtual machines allow different qualities of service (QoS) to be employed for the resources used by multiple tenants in a virtualized environment by controlling the traffic of input/ output (I/O) for each of the individual virtual machines that share the same hardware platform through a hyper-visor. The hyper-visor will be configured to give different QoS to different virtual machines. Aspects of the present invention recognize that virtual machines can be employed to control the processing speed or latency experienced by each client by separating the different requests from interactive clients and batch clients.

Figure 1:
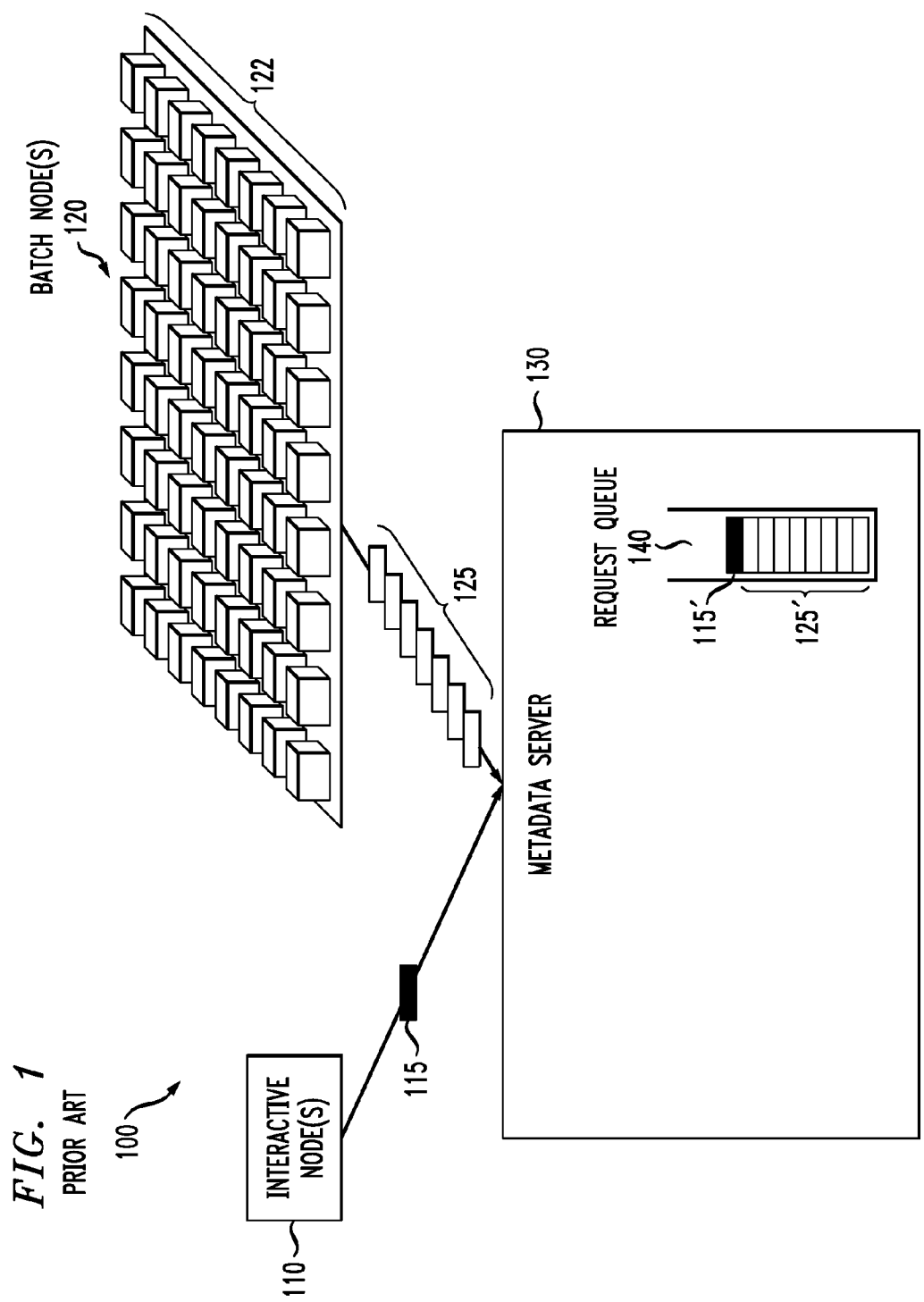
FIG. 1 illustrates an exemplary conventional parallel computing system.

FIG. 1 illustrates an exemplary conventional parallel computing system 100. As shown in FIG. 1, the exemplary conventional parallel computing system 100 comprises one or more interactive nodes 110, one or more batch nodes 120, such as a supercomputer having a plurality of compute nodes, and one or more metadata servers 130. In addition, the conventional parallel computing system 100 typically also comprises one or more data servers (not shown in FIG. 1). The interactive nodes 110 comprise one or more interactive clients 112 to execute one or more interactive tasks for a human user. The batch node(s) 120 execute a plurality of batch jobs 122 for one or more batch clients (not shown) in parallel. The data servers (not shown) store and retrieve user data. The exemplary metadata server 130 identifies the data servers where particular data is stored and processes queries about the data, such as the size; permissions, and timestamps of the data.

Generally, batch jobs are executed on a computer without manual intervention. Interactive jobs, on the other hand, prompt the user for inputs. A batch job takes a set of data files as input, processes the data in the background, and produces a set of output data files (i.e., input data is collected into batches of files and processed in batches by a program).

In the exemplary conventional parallel computing system 100 of FIG. 1, the interactive nodes 110 and batch nodes 120 are interacting with the same file system.

As shown in FIG. 1, the exemplary interactive node 110 provides one or more interactive metadata requests 115 to the exemplary metadata server 130 of the shared file system. For example, the interactive metadata requests 115 may include a file directory request or a listing of files and the corresponding metadata, such as ownership, size, timestamps and permission. In addition, the exemplary batch node 120 provides a plurality of batch metadata requests 125 to the exemplary metadata server 130. For example, the batch metadata requests 125 may include file creation requests or data read or write operations that will occasionally require metadata lookups. The exemplary metadata server 130 stores the metadata requests 115, 125 in a request queue 140 in a known manner, typically based on an order of arrival. The metadata requests 115, 125 correspond to work or tasks to be performed by the exemplary metadata server 130. The metadata requests 115 from the interactive node(s 110) are stored by the metadata server 130 in the request queue 140 as queued metadata requests 115. The metadata requests 125 from the batch node(s) 120 are stored by the metadata server 130 in the request queue 140 as queued metadata requests 125'.

As shown in FIG. 1, the request queue 140 can become a bottleneck and the interactive metadata requests 115 of the interactive node(s) 110 can be "starved" by a large number of batch metadata requests 125 from batch jobs executing on the batch node(s) 120. Thus, the interactive metadata requests 115 may have to wait in the request queue 140 until the earlier-arriving batch metadata requests 125 have been processed by the exemplary metadata server 130.

Figure 2:
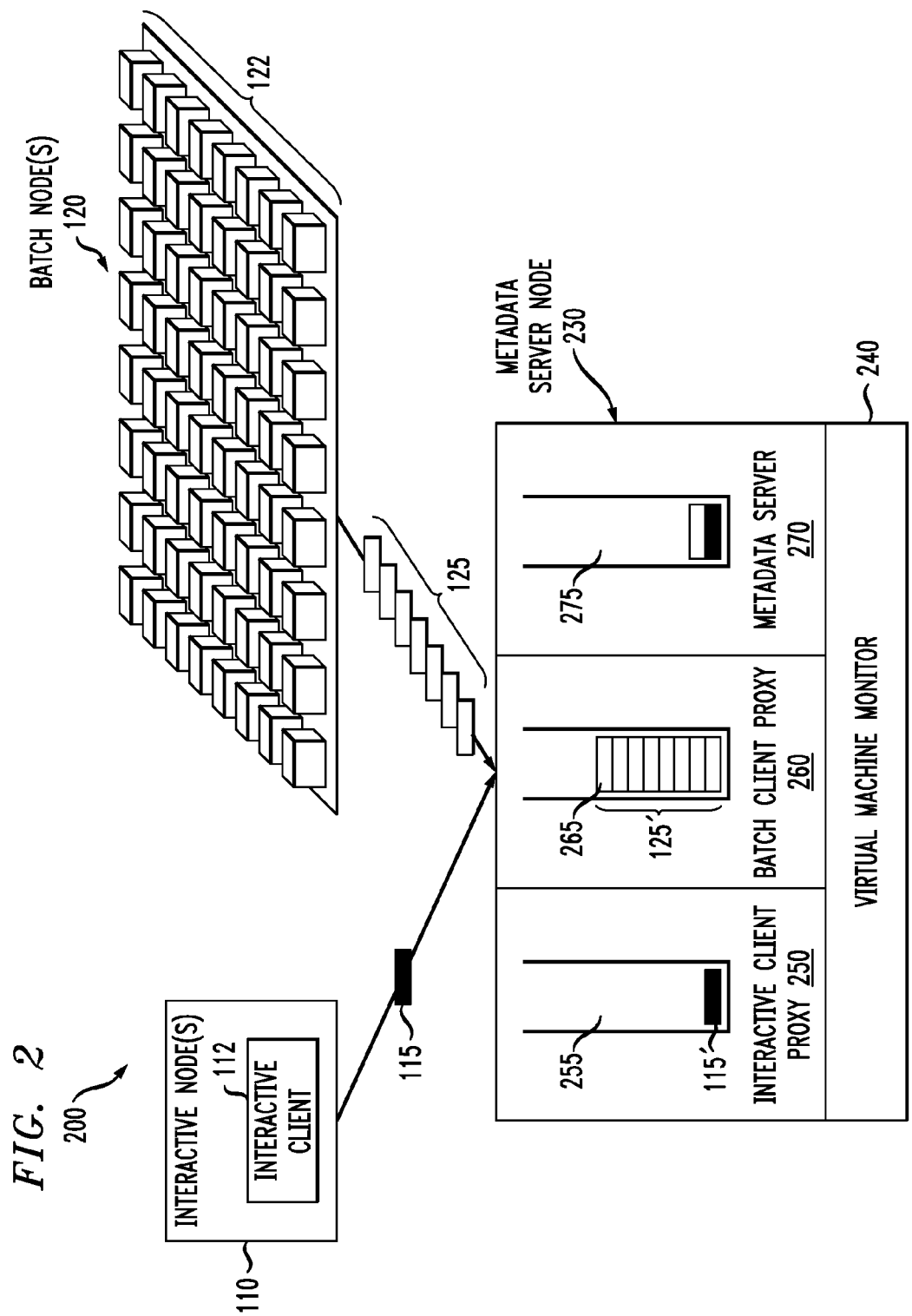
FIG. 2 illustrates an exemplary parallel computing system in which aspects of the present invention can operate.

As indicated above, aspects of the present invention recognize that virtual machines can be employed to control the processing speed or latency experienced by each interactive client on the interactive node(s) 110 by separating the different requests 115, 125 from interactive nodes 110 and batch nodes 120. FIG. 2 illustrates an exemplary parallel computing system 200 in which aspects of the present invention can operate. As shown in FIG. 2, the interactive nodes 110 and batch nodes 120 operate in a similar manner as FIG. 1 to generate metadata requests 115, 125.

The metadata requests 115, 125 are processed in FIG. 2 by a metadata server node 230. The metadata server node 230 comprises a virtual machine monitor 240, a proxy 250 of the interactive client 112 of FIG. 1, a proxy 260 of the batch clients of FIG. 1 and a metadata server 270. The metadata server 270 operates in a similar manner to the metadata server 130 of FIG. 1 to process metadata requests 115, 125. The interactive client proxy 250 and batch client proxy 260 can be implemented, for example, as thin clients.

As shown in FIG. 2, the virtual machine monitor 240 of FIG. 2 provides a plurality of request queues 255, 265 to separately queue the metadata requests 115, 125 of the interactive nodes 110 and batch nodes 120. In this manner, the various metadata requests 115, 125 from the interactive clients 112 and batch clients on batch nodes 120 can be prioritized based on a predefined policy. In the embodiment of FIG. 2, the virtual machine monitor 240 provides an interactive client proxy 250 and a batch client proxy 260 to separately queue the metadata requests 115, 125 from the interactive clients 112 and batch clients on batch nodes 120, respectively. For example, metadata requests from interactive users can be prioritized over batch jobs so that a human user can work interactively with the parallel file system. The metadata requests 115 from the interactive node(s) 110 are stored by the metadata server node 230 in the request queue 255 as queued metadata requests 115'. The metadata requests 125 from the batch node(s) 120 are stored by the metadata server node 230 in the request queue 265 as queued metadata requests 125'.

In the embodiment of FIG. 2, the interactive client proxy 250, batch client proxy 260 and metadata server 270 are each implemented as virtual machines. The virtual machine monitor 240 may be the entity that throttles the batch client proxy 260 or the batch client proxy 260 might be self throttling or the batch client proxy 260 might talk to the interactive client proxy 250 about when to throttle.

The interactive client proxy 250 runs a file system client to aggregate requests from the interactive nodes 110. The batch client proxy 260 runs a second file system client to aggregate requests from the batch jobs 122 on the batch nodes 120. A file system client is an entity that talks to the file system metadata server and the file system data server. In this manner, metadata requests are stored in a plurality of queues 255, 265, 275 (one in each file system client on proxies 250, 260 and one in the metadata server 270). The virtual machine monitor 240 can then control the relative resources (e.g., bandwidth and processing capacity) consumed by the interactive clients and batch clients, for example, based on a policy or rules. This will then effectively prioritize how requests are moved from the two client queues 255, 265 into the metadata server queue 275. This can ensure timely interactive responses for the interactive users of the interactive nodes 110.

It is to be appreciated, however, that embodiments of the invention are not restricted to use with the particular illustrative system and device configurations shown. Moreover, the phrases "computing system" and "data storage system" and variations thereof as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A metadata server node for use in a file system shared by one or more interactive nodes and one or more batch nodes, wherein said one or more interactive nodes comprise one or more interactive clients to execute one or more interactive tasks and wherein said one or more batch nodes execute one or more batch jobs for one or more batch clients, said metadata server node comprising:
    a virtual machine monitor;
    an interactive client proxy to store metadata requests from said one or more interactive clients in an interactive client queue, wherein said metadata requests require a lookup of metadata;
    a batch client proxy to store metadata requests from said one or more batch clients in a batch client queue;
    a metadata server to store said metadata requests from said interactive client queue and said batch client queue in a metadata queue based on an allocation of resources by said virtual machine monitor; and
    wherein said interactive client proxy, said batch client proxy and said metadata server are implemented as a virtual machine.

2. The metadata server node of claim 1, wherein said metadata requests are prioritized based on one or more of a predefined policy and predefined rules.

3. The metadata server node of claim 1, wherein said metadata requests from said one or more interactive clients are prioritized over said metadata requests from said one or more batch clients.

4. The metadata server node of claim 1, wherein said interactive client proxy executes said one or more interactive clients.

5. The metadata server node of claim 1, wherein said batch client proxy executes said one or more batch clients.

6. The metadata server node of claim 1, wherein said allocation of resources further comprises allocating relative resources consumed by said one or more interactive clients and said one or more batch clients.

7. A method for storing metadata requests in a file system shared by one or more interactive nodes and one or more batch nodes, wherein said one or more interactive nodes comprise one or more interactive clients to execute one or more interactive tasks and wherein said one or more batch nodes execute one or more batch jobs for one or more batch clients, said method comprising:
    storing metadata requests from said one or more interactive clients in an interactive client queue, wherein said metadata requests require a lookup of metadata;
    storing metadata requests from said one or more batch clients in a batch client queue;
    storing said metadata requests from said interactive client queue and said batch client queue in a metadata queue based on an allocation of resources by a virtual machine monitor; and
    wherein said interactive client queue, said batch client queue and said metadata queue are implemented as a virtual machine.

8. The method of claim 7, wherein said metadata requests are prioritized based on one or more of a predefined policy and predefined rules.

9. The method of claim 7, wherein said metadata requests from said one or more interactive clients are prioritized over metadata requests from said one or more batch clients.

10. The method of claim 7, wherein an interactive client proxy executes said one or more interactive clients.

11. The method of claim 7, wherein a batch client proxy executes said one or more batch clients.

12. The method of claim 7, wherein said allocation of resources further comprises allocating relative resources consumed by said one or more interactive clients and said one or more batch clients.

13. A non-transitory machine-readable storage medium for processing metadata requests in a file system shared by one or more interactive nodes and one or more batch nodes, wherein said one or more interactive nodes comprise one or more interactive clients to execute one or more interactive tasks and wherein said one or more batch nodes execute one or more batch jobs for one or more batch clients, wherein one or more software programs when executed by one or more processing devices implement the following steps:
    storing metadata requests from said one or more interactive clients in an interactive client queue, wherein said metadata requests require a lookup of metadata;
    storing metadata requests from said one or more batch clients in a batch client queue;
    storing said metadata requests from said interactive client queue and said batch client queue in a metadata queue based on an allocation of resources by a virtual machine monitor; and
    wherein said interactive client queue, said batch client queue and said metadata queue are implemented as a virtual machine.

14. The storage medium of claim 13, wherein said metadata requests are prioritized based on one or more of a predefined policy and predefined rules.

15. The storage medium of claim 13, wherein said metadata requests from said one or more interactive clients are prioritized over metadata requests from said one or more batch clients.

16. The storage medium of claim 13, wherein an interactive client proxy executes said one or more interactive clients.

17. The storage medium of claim 13, wherein a batch client proxy executes said one or more batch clients.

18. The storage medium of claim 13, wherein said allocation of resources further comprises allocating relative resources consumed by said one or more interactive clients and said one or more batch clients.

* * * * *